United States Patent Office.

JOSEPH NEUBRAND, OF GREEN POINT, NEW YORK.

*Letters Patent No. 83,529, dated October 27, 1868.*

IMPROVED COMPOSITION FOR FORMING TILES, FLOORS, AND FOR OTHER PURPOSES

The Schedule referred to in these Letters Patent and making part of the same.

*To all whom it may concern:*

Be it known that I, JOSEPH NEUBRAND, of Green Point, in the county of Kings, and State of New York, have invented a new and improved Compound for Artificial Stone; and I do hereby declare the following to be a full, clear, and exact description thereof, which will enable those skilled in the art to make and use the same.

This invention relates to a compound for artificial stone, which consists of white clay, or kaolin, flint, feldspar and heavy spar, in combination with suitable pigments, in such a manner that tiles of any desired shape and color can be formed, which are strong, durable, and fit for floors or walks, either in the open air or under cover.

In preparing my artificial stone, I take equal parts of the above-named ingredients, in the form of fine powders, and mix them with a sufficient quantity of water, to form a plastic mass, to which is added the proper pigment, such as oxide of cobalt for blue, salts of chromium for green and red, &c., and then the mass is moulded into tiles of the required form or shape, which are finally burned in suitable kilns.

By raising the heat in the kiln sufficiently high, the ingredients of my compound are fused together, and tiles are formed which are capable of withstanding the influence of the atmosphere, and which can be used with great advantage for floors or walks.

Having thus described my invention,

What I claim as new, and desire to secure by Letters Patent, is—

The combination of the within-described articles for the purpose specified.

JOSEPH NEUBRAND.

Witnesses:
W. HAUFF,
E. F. KASTENHUBER.